UNITED STATES PATENT OFFICE.

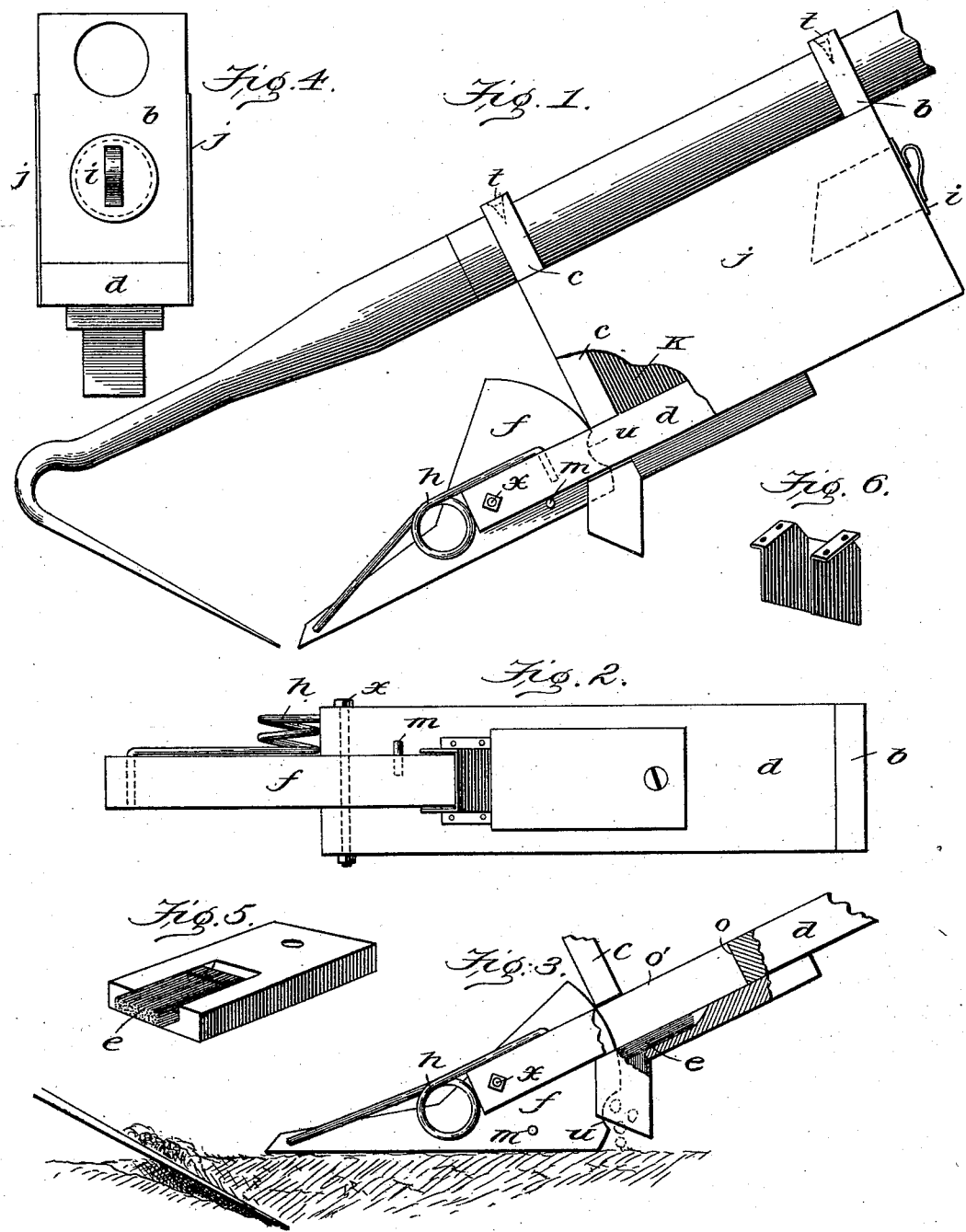

SEYMOUR AUGUSTUS AYRES, OF LANSING, MICHIGAN.

AUTOMATIC CORN-DROPPER.

SPECIFICATION forming part of Letters Patent No. 578,619, dated March 9, 1897.

Application filed June 8, 1896. Serial No. 594,711. (No model.)

*To all whom it may concern:*

Be it known that I, SEYMOUR AUGUSTUS AYRES, of Lansing, in the county of Ingham and State of Michigan, have invented an Improved Corn-Dropper, of which the following is a specification.

My invention relates to a device for dropping corn or other seed of a like nature in conjunction with a hoe, the device being fastened to the hoe-handle just back of the blade, which when thrust in the ground causes a lever to be thrown up by the dirt, causing the seed to be dropped ready to be covered by the said dirt on the hoe-blade.

With these objects in view the invention consists of the details of construction and arrangement which will more fully appear hereinafter.

In the accompanying drawings, which form a part of this application, Figure 1 is a side elevation of the device attached to a hoe. Fig. 2 is a bottom plan view. Fig. 3 is a side view of a portion of the device while the blade of the hoe is in the ground. Fig. 4 is an end view. Fig. 5 is a corner view of the brush. Fig. 6 is a corner view of the guide which causes the corn to be thrown downward when the stroke is taken.

Like letters of reference indicate corresponding parts in the several views.

To fill the reservoir K with the seed to be planted, you withdraw the scoop $i$ from the opening in the back upright $b$ and fill the reservoir K through the opening in $b$. When filled, the scoop $i$ is replaced in order to keep the corn in the reservoir K.

The reservoir K is formed by the casing $j$, front upright $c$, back upright $b$, and base $d$. On the bottom of the base $d$ the casing $j$ is situated. The said uprights are also fastened to the bottom of the said base. A slot $o'$ extends from the front end to $o$, which is filled by the lever $f$ up to a point where the base unites with the front upright $c$. Beyond this point the slot is opened to K, letting the seed drop into the slot $o'$. The bottom of the said slot not occupied by the lever $f$ is covered by the cut-off brush $e$. The lever $f$ is made to swing in the said slot on the bolt $x$ and is held down by the spring $h$. A pin $m$ is used to prevent the lever from going too far.

To operate the device, the dropper is attached to a hoe-handle, as shown, by the uprights $c$ and $b$ and the screws $t$. The seed drops into the slot not occupied by the lever $f$ and fills the slot $u$, Fig. 3, in the convex surface of the lever $f$ when the hoe-blade $a$ is thrust into the ground. The lever $f$ being thrown up by the force of the earth the seed that was in the slot $u$ of the convex surface of the lever $f$ passes the brush $e$, which is for the purpose of keeping the corn from clogging in the said slot $u$.

The seed is dropped directly into the earth and is covered by the dirt on the blade of the hoe. The cut-off brush $e$ is made by filling the slot $o$ with ordinary binding-twine or other suitable material and in any suitable way.

Having thus described my invention, what I claim as new, and desire to secure by Letters Patent, is—

In a corn-dropper, the combination with a hoe, an outer casing attached to the hoe-handle, the said casing forming a reservoir for the reception of the seed to be planted, a slot in the bottom of the said reservoir or casing, a lever in the said slot, a cut-off brush $e$ in the said slot, a lever $f$ swinging in the said slot on a bolt $x$, a spring $h$ for holding down the said lever, the said lever $f$ to be operated by the pressure of the earth when the hoe is struck into the earth, substantially as set forth.

In testimony whereof I affix my signature in the presence of witnesses.

SEYMOUR AUGUSTUS AYRES.

Witnesses:
    WM. A. FRASER,
    G. F. OTTMAR,
    C. W. AYRES.